US010805302B2

(12) United States Patent
Sanaullah et al.

(10) Patent No.: US 10,805,302 B2
(45) Date of Patent: Oct. 13, 2020

(54) SYSTEMS AND METHODS TO SECURE PLATFORM APPLICATION SERVICES BETWEEN PLATFORM CLIENT APPLICATIONS AND PLATFORM SERVICES

(71) Applicant: Dell Products L.P., Round Rock, TX (US)

(72) Inventors: Abu Shaher Sanaullah, Austin, TX (US); Mohit Arora, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 259 days.

(21) Appl. No.: 16/035,943

(22) Filed: Jul. 16, 2018

(65) Prior Publication Data

US 2020/0021595 A1 Jan. 16, 2020

(51) Int. Cl.
*H04L 29/06* (2006.01)
*G06F 9/54* (2006.01)
*H04L 12/24* (2006.01)

(52) U.S. Cl.
CPC ............ *H04L 63/101* (2013.01); *G06F 9/547* (2013.01); *H04L 41/28* (2013.01); *H04L 63/126* (2013.01)

(58) Field of Classification Search
CPC ..... H04L 63/101; H04L 63/126; H04L 41/28; G06F 9/547
See application file for complete search history.

(56) References Cited

U.S. PATENT DOCUMENTS

| 9,058,504 | B1 * | 6/2015 | Swanson | G06F 21/52 |
| 2016/0085604 | A1 * | 3/2016 | Rajagopalan | G06F 9/547 |
| | | | | 719/328 |
| 2016/0323106 | A1 * | 11/2016 | Roper | G06F 21/51 |
| 2018/0255101 | A1 * | 9/2018 | Adam | H04L 9/3247 |
| 2018/0285554 | A1 * | 10/2018 | Biswas | G06F 21/6281 |

\* cited by examiner

Primary Examiner — Nelson S. Giddins
(74) Attorney, Agent, or Firm — Baker Botts L.L.P.

(57) ABSTRACT

Systems and methods to secure platform application services between platform client applications and platform services in an information handling system. The information handling system may include a client application that may transmit an application service request over an application services inter-process communication (IPC) channel. The information handling system may also include a server services application that may receive the application service request from the client application via the application services IPC channel. The server services application may query a publisher name of the client application and authenticate the client application based on the publisher name of the client application and a list of trusted client application publishers maintained by the server services application. When the client application is authenticated, the server services application may process the first application service request.

18 Claims, 5 Drawing Sheets

500 — METHOD FOR SECURING APPLICATION SERVICE PROVIDERS
FROM UNTRUSTED CLIENTS

TRANSMITTING, BY A FIRST CLIENT APPLICATION OF AN INFORMATION HANDLING SYSTEM, AN FIRST APPLICATION SERVICE REQUEST OVER AN APPLICATION SERVICES INTER-PROCESS COMMUNICATION (IPC) CHANNEL — 502

RECEIVING, BY A SERVER SERVICES APPLICATION OF THE INFORMATION HANDLING SYSTEM, THE FIRST APPLICATION SERVICE REQUEST FROM THE FIRST CLIENT APPLICATION VIA THE APPLICATION SERVICES IPC CHANNEL — 504

QUERYING, BY THE SERVER SERVICES APPLICATION, A PUBLISHER NAME OF THE FIRST CLIENT APPLICATION — 506

AUTHENTICATING, BY THE SERVER SERVICES APPLICATION, THE FIRST CLIENT APPLICATION THAT MAY BE BASED ON THE PUBLISHER NAME OF THE FIRST CLIENT APPLICATION AND A LIST OF TRUSTED CLIENT APPLICATION PUBLISHERS MAINTAINED BY THE SERVER SERVICES APPLICATION — 508

WHEN THE FIRST CLIENT APPLICATION IS AUTHENTICATED, PROCESSING, BY THE SERVER SERVICES APPLICATION, THE FIRST APPLICATION SERVICE REQUEST — 510

FIG. 5

SYSTEMS AND METHODS TO SECURE PLATFORM APPLICATION SERVICES BETWEEN PLATFORM CLIENT APPLICATIONS AND PLATFORM SERVICES

BACKGROUND

Field of the Disclosure

This disclosure relates generally to information handling systems and, more particularly, to systems and methods to secure platform application services between platform client applications and platform services.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one embodiment, a disclosed information handling system may include a first client application that may transmit an first application service request over an application services inter-process communication (IPC) channel. The information handling system may also include a server services application that may receive the first application service request from the first client application via the application services IPC channel, query a publisher name of the first client application, authenticate the first client application based on the publisher name of the first client application and a list of trusted client application publishers maintained by the server services application, and when the first client application is authenticated, process the first application service request.

In a number of the disclosed embodiments of the information handling system, the information handling system may also include a network and an identity management system coupled to the network. The server services application may further, when the server services application starts, request a master list of trusted client application publishers from the identity management system via the network, receive the master list of trusted client application publishers from the identity management system, verify integrity of the master list of trusted client application publishers, and when the integrity of the master list of trusted client application publishers has been verified, save the master list of trusted client application publishers to the list of trusted client application publishers maintained by the server services application.

In a number of the disclosed embodiments of the information handling system, the information handling system may also include a network and an identity management system coupled to the network. The server services application may further determine whether a master list of trusted client application publishers at the identity management system has been updated. The server services application may also, when the master list of trusted client application publishers has been updated, request the updated master list of trusted client application publishers from the identity management system via the network, receive the updated master list of trusted client application publishers from the identity management system, verify integrity of the updated master list of trusted client application publishers, and when the integrity of the updated master list of trusted client application publishers has been verified, update the list of trusted client application publishers maintained by the server services application with the master list of trusted client application publishers.

In a number of the disclosed embodiments of the information handling system, the master list of trusted client application publishers may be asymmetrically signed and the integrity of the master list of trusted client application publishers may be verified using a public key within the server services application.

In a number of the disclosed embodiments of the information handling system, the list of trusted client application publishers may include at least one publisher identification.

In a number of the disclosed embodiments of the information handling system, the first client application may be authenticated when the publisher name of the first client application corresponds to a publisher identification in the list of trusted client application publishers maintained by the server services application.

In a number of the disclosed embodiments of the information handling system, the authentication of the first client application may further be based on an application name of the first client application. The first client application may be further authenticated when the application name of the first client application is found in a list of trusted client application names maintained by the server services application associated with the publisher name of the first client application.

In a number of the disclosed embodiments of the information handling system, the server services application may further, when the verification of the integrity of the master list of trusted client application publishers fails, determine whether a previous verified list of trusted client application publishers maintained by the server services application is available, and when the previous verified list of trusted client application publishers is available, save the previous verified list of trusted client application publishers to the list of trusted client application publishers maintained by the server services application.

In a number of the disclosed embodiments of the information handling system, the server services application may further comprise an application services constructor. The application services constructor may perform the query of the publisher name of the first client application.

In a number of the disclosed embodiments of the information handling system, the server services application may comprise a universal windows platform (UWP) application and the first client application may comprise a UWP application.

In a number of the disclosed embodiments of the information handling system, the first application service request may comprise one of a request to utilize a device specific application programming interfaces (APIs) of a device of the information handling system, a request to access device capabilities of a device of the information handling system, and a request to communicate with a second client application of the information handling system.

In a number of the disclosed embodiments of the information handling system, the second client application may be a 32-bit version of a windows (Win32) application.

In a number of the disclosed embodiments of the information handling system, the server services application may also, when the authentication of the first client application fails, the first application service request may be denied.

In a second embodiment, a disclosed method may include transmitting, by a first client application of an information handling system, an first application service request over an application services inter-process communication (IPC) channel. The method may also include receiving, by a server services application of the information handling system, the first application service request from the first client application via the application services IPC channel. The method may further include querying, by the server services application, a publisher name of the first client application. The method may also include authenticating, by the server services application, the first client application that may be based on the publisher name of the first client application and a list of trusted client application publishers maintained by the server services application. The method may further include, when the first client application is authenticated, processing, by the server services application, the first application service request.

In a number of the disclosed embodiments of the method, the method may also include, when the server services application may be starting, requesting a master list of trusted client application publishers from an identity management system coupled to the information handling system by a network, receiving the master list of trusted client application publishers from the identity management system, verifying integrity of the master list of trusted client application publishers, and when the integrity of the master list of trusted client application publishers has been verified, saving the master list of trusted client application publishers to the list of trusted client application publishers maintained by the server services application.

In a number of the disclosed embodiments of the method, the method may also include determining, by the server services application, whether a master list of trusted client application publishers at an identity management system has been updated. The identity management system may be coupled to the information handling system by a network. The method may further include, when the master list of trusted client application publishers has been updated, requesting the updated master list of trusted client application publishers from an identity management system coupled to the information handling system via a network. The method may also receiving the updated master list of trusted client application publishers from the identity management system, verifying integrity of the updated master list of trusted client application publishers, and when the integrity of the updated master list of trusted client application publishers has been verified, updating the list of trusted client application publishers maintained by the server services application with the master list of trusted client application publishers. The master list of trusted client application publishers may be asymmetrically signed and the integrity of the master list of trusted client application publishers may be verified using a public key within the server services application.

In a number of the disclosed embodiments of the method, the first client application may be authenticated when the publisher name of the first client application corresponds to a publisher identification in the list of trusted client application publishers maintained by the server services application. The list of trusted client application publishers may comprise at least one publisher identification.

In a number of the disclosed embodiments of the method, the method may also include, when the verification of the integrity of the master list of trusted client application publishers fails determining whether a previous verified list of trusted client application publishers maintained by the server services application may be available. The method may further include, when the previous verified list of trusted client application publishers may be available, saving the previous verified list of trusted client application publishers to the list of trusted client application publishers maintained by the server services application. The server services application may comprise a universal windows platform (UWP) application and the first client application may comprise a UWP application.

In a number of the disclosed embodiments of the method, the first application service request may comprise one of a request to utilize a device specific application programming interfaces (APIs) of a device of the information handling system, a request to access device capabilities of a device of the information handling system, and a request to communicate with a second client application of the information handling system, and wherein the second client application is a 32-bit version of a windows (Win32) application.

BRIEF DESCRIPTION OF THE DRAWINGS

For a more complete understanding of the present invention and its features and advantages, reference is now made to the following description, taken in conjunction with the accompanying drawings, in which:

FIG. 5 is a flowchart depicting selected elements of an embodiment of a method for securing application service providers from untrusted clients.

DESCRIPTION OF PARTICULAR EMBODIMENT(S)

Figure 1:
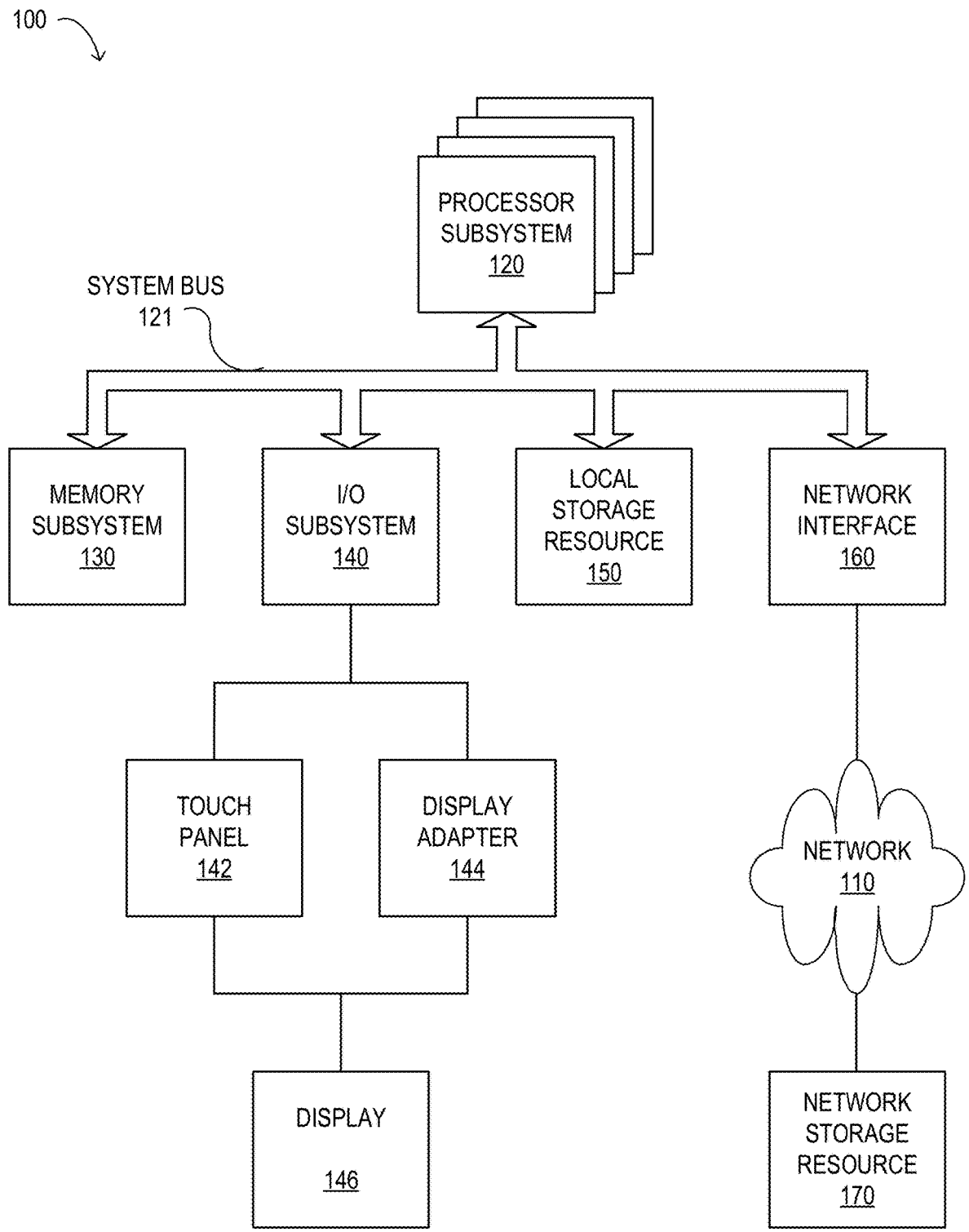
FIG. 1 is a block diagram of selected elements of an embodiment of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72."

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1, 2, 3, 4, and 5 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, T1, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device. As shown, I/O subsystem 140 may comprise touch panel 142 and display adapter 144. Touch panel 142 may include circuitry for enabling touch functionality in conjunction with display 146 that is driven by display adapter 144.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

A platform application services system may include platform client applications, platform application services, and a platform application services inter-process communication (IPC) channel. The platform application services may provide a communication mechanism between the platform client applications and the platform application services. Typical platform application services systems, such as Microsoft's Universal Windows Platform (UWP) system, provide application services (App Services) as a communication mechanism between UWP client applications and UWP processes. However, the communication mechanisms do not verify the identity of the client applications and processes communicating across the App Services IPC channel. Without authenticating the client applications and processes, all communications are exposed to spoofing, information disclosure, denial of service and elevation of privilege attacks. The traditional authentication methods used for authentication are easy to overcome. Hard-coded keys can be lifted from the binary, key generation algorithms can be reversed engineered, and Obfuscation can be reversed. As such these platform application services systems may be compromised using malicious and untrusted applications to connect and consume the platform application services.

As will be described in further detail herein, the inventors of the present disclosure have discovered systems and methods to secure platform application services between platform client applications and platform services. This solution may include client applications, a server services application, and an application services IPC channel. The server services application may download a list of trusted client application publishers from an identity management system and verify the integrity of the list of trusted client application publishers. When a client application requests an application service from the server services application, the server services application may query a publisher name of the client application. The server services application may authenticate the client application based on the publisher name of the client application and the verified list of trusted client application publishers maintained by the server services application, and when the first client application is authenticated, process the first application service request. The client application may be authenticated when the publisher name of the client application corresponds to a publisher identification in the verified list of trusted client application publishers. When the client application is authenticated, the server services application may process the application service request. When authentication of the client application fails, the server services application denies the application service request.

Figure 2:
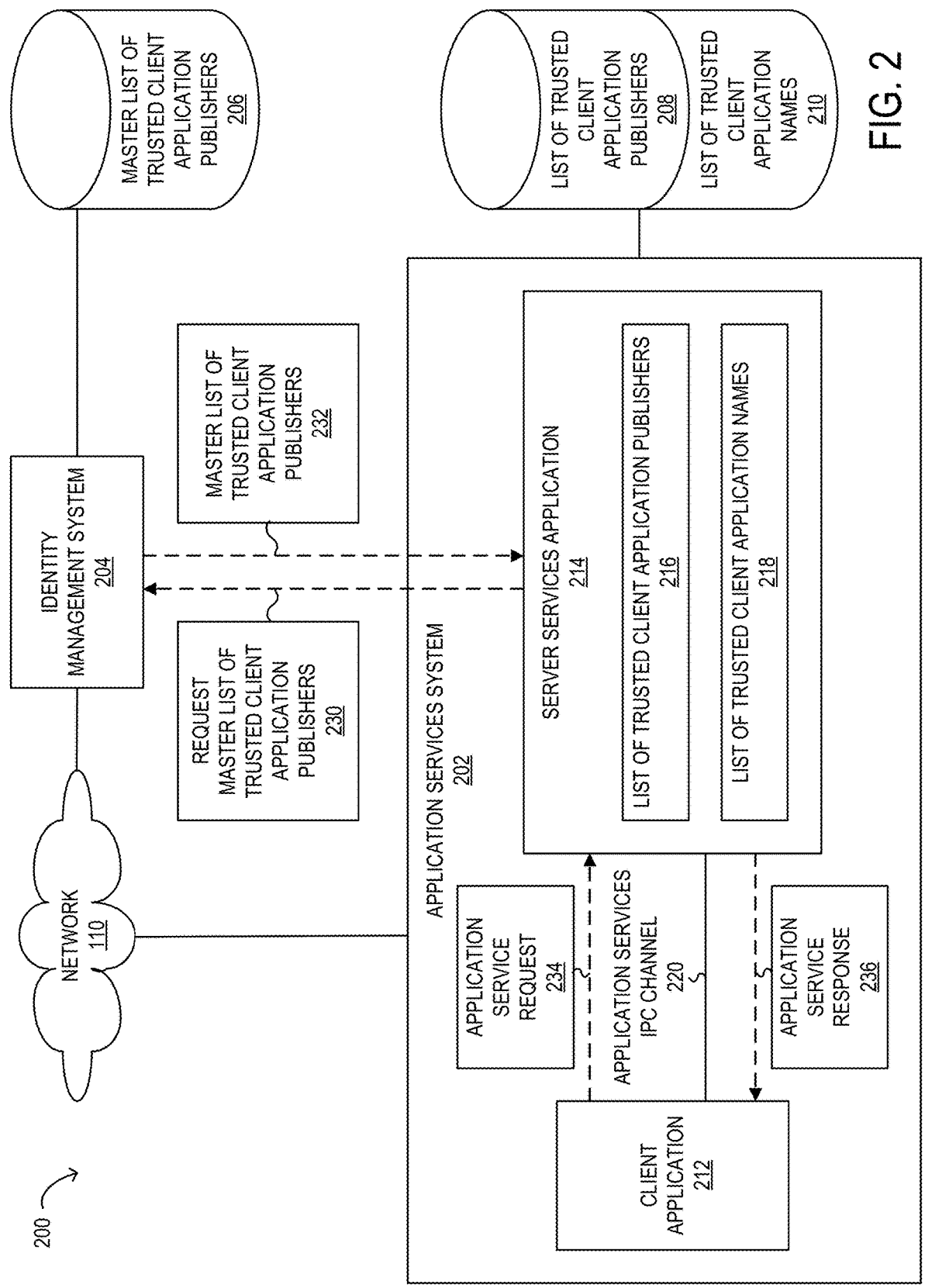
FIG. 2 is a block diagram of selected elements of an embodiment of an exemplary secure application services system for securing application service providers from untrusted clients.

Turning now to FIG. 2, a block diagram depicting selected elements of an embodiment of an exemplary secure application services system 200 for securing application service providers from untrusted clients. As shown in FIG. 2, components of secure application services system 200 may include, but are not limited to, network 110, an application services system 202, an identity management system 204, a master list of trusted client application publishers 206, and a list of trusted client application publishers 208. In FIG. 2, each of application services system 202 and identity management system 204 may be an information handling system 100 and may be coupled to each other via network 110. The master list of trusted client application publishers 206 may be stored at memory subsystem 130 or local storage resource 150 of identity management system 204 or network storage resource 170 of secure application services system 200. The master list of trusted client application publishers 206 may be coupled to processor subsystem 120 of identity management system 204. Similarly, the list of trusted client application publishers 208 may be stored at memory subsystem 130 or local storage resource 150 of application services system 202 or network storage resource 170 of secure application services system 200. The list of trusted client application publishers 208 may be coupled to processor subsystem 120 of application services system 202. Each of the lists of trusted client application publishers 206 and 208 may include at least one publisher identification corresponding to a publisher name and may be utilized to authenticate a specific client application based on the publisher name of the specific client application.

Application services system 202 may include a client application 212, a server services application 214, and an application services inter-process communication (IPC) channel 220. A memory of memory subsystem 130 of application services system 202 may store a set of code instructions that can be executed by a processor of processor subsystem 120 of application services system 202 to perform one or more of the methods or computer based functions disclosed herein. In FIG. 2, Client application 212 may comprise a first set of code instructions that can be executed by the processor of application services system 202 and server services application 214 may comprise a second set of code instructions that can be executed by the processor of application services system 202. In one or more embodiments, client application 212 may comprise a universal windows platform (UWP) application, a 32-bit version of a windows (Win32) application, or another type of application. In one or more embodiments, server services application 214 may comprise a UWP application, or another type of application.

Identity management system 204 maintains the master list of trusted client application publishers 206. A publisher may create a client application and add the client application and the publisher of the client application to a secure database of identity management system 204 through a registration process. An administrator of identity management system 204 may verify the integrity of the publisher and the client application. Once the integrity of the publisher and the client application has been verified, the administrator may add the client application to the secure database and may certify that the publisher is a trusted publisher. Identity management system 204 may add a publisher identification corresponding to the trusted publisher to the master list of trusted client application publishers 206. The publisher identification may comprise a cryptographically generated key. The master list of trusted client application publishers 206 may comprise one or more publisher identifications each publisher identification may comprise a unique cryptographically generated key corresponding to the trusted publisher and trusted by identity management system 204. The master list of trusted client application publishers 206 may also be asymmetrically signed to ensure the security and integrity of the master list. In an embodiment, identity management system may comprise the Microsoft store and the authenticity of the publisher is trusted because the Microsoft store utilizes a secure registration process for authentication of the publisher before it can be added to the master list of trusted client application publishers 206.

Application services system 202 may maintain the list of trusted client application publishers 208. A publisher of a client application may provide the publisher identification, the unique cryptographically generated key corresponding to the trusted publisher, assigned by identity management system 204 to an administrator of application services system 202. The administrator of application services system 202 may add the publisher identification to the list of trusted client application publishers 208. In one or more embodiments, application services system 202 may maintain a list of trusted client application names 210. The administrator of application services system 202 may add a client application name and associated information of a trusted client application such as client application 212 to the list of trusted client application names 210. Each trusted client application name corresponds to a specific publisher of the trusted client application.

During the start of server services application 214, server services application 214 may transmit a request for a master list of trusted client application publishers 230 to identity management system 204. In response to the request, identity management system 204 may transmit a master list of trusted client application publishers 232 based on the master list of trusted client application publishers 206 to application services system 202. Server services application 214 may receive the master list of trusted client application publishers 232 from identity management system 204. In an embodiment, server services application 214 may download the master list of trusted client application publishers 232 from identity management system 204. Server services application 214 may verify the integrity of the received master list of trusted client application publishers 232. The received master list of trusted client application publishers 232 may be asymmetrically signed and the integrity of the master list of trusted client application publishers may be verified using a public key within server services application 214. When the integrity of the master list of trusted client application publishers 232 has been verified, server services application 214 may save the master list of trusted client application publishers 232 to the list of trusted client application publishers 208 maintained by server services application 214.

During operation, server services application 214 may determine whether the master list of trusted client application publishers 206 at identity management system 204 has been updated. Server services application 214 may use a polling method to periodically poll identity management system 204 to determine if the master list of trusted client application publishers 206 has been updated. Server services application 214 may also receive a notification from identity management system 204 that the master list of trusted client application publishers 206 has been updated. Server services application 214 may utilize a detection method or another type of method to determine that the master list of trusted client application publishers 206 has been updated. When server services application 214 determines that the master list of trusted client application publishers 206 has been updated, server services application 214 may request an updated version of master list of trusted client application publishers 206 from identity management system 204, receive the updated version of the master list of trusted client application publishers 206 from identity management system 204, and verify the integrity of the updated version of the master list of trusted client application publishers 206. When the integrity of the updated version of the master list of trusted client application publishers 206 has been verified, server services application 214 may update the list of trusted client application publishers 208 maintained by server services application 214 with the updated version of the master list of trusted client application publishers 206.

In one or more embodiments, when the verification of the integrity of the master list of trusted client application publishers 206 fails, server services application 214 may determine whether a previous verified list of trusted client application publishers maintained by server services application 214 is available. When server services application 214 determines that a previous verified list of trusted client application publishers is available, server services application 214 may save the previous verified list of trusted client application publishers to the list of trusted client application publishers 208 maintained by server services application 214. When server services application 214 determines that a previous verified list of trusted client application publishers is not available, server services application 214 may send a notification to the administrator of application services system 202 indicating that server services application 214 was unable to verify the integrity of the list of trusted client application publishers 232 received from identity management system 204 and no previously verified list of trusted client application publishers exists so that corrective action may be taken. Server services application 214 may also send this notification to the administrator of identity management system 204 so corrective action may be taken.

During operation, client application 212 may transmit an application service request 234 to server services application 214 over application services IPC channel 220. An application service request may comprise one of a request to utilize a device specific application programming interfaces (APIs) of a device of application services system 202, a request to access device capabilities of a device of application services system 202, and a request to communicate with another client application of application services system 202. Server services application 214 may receive application service request 234 from client application 212 via the application services IPC channel 220. Server services application 214 may query a publisher name of client application 212. Server services application 214 may comprise an application services constructor and the application services constructor may perform the query of the publisher name of client application 212. Once server services application 214 has obtained the publisher name of client application 212, server services application 214 may load the list of trusted client application publishers 208 to a list of trusted client application publishers 216 for utilization by server services application 214. Server services application 214 may also load the list of trusted client application names 210 to a list of trusted client application name 218. Server services application 214 may then authenticate client application 212 based on the publisher name of client application 212 and the list of trusted client application publishers 216. Server services application 214 may authenticate client application 212 by searching the list of trusted client application publishers 216 for a publisher identification that corresponds to the publisher name of client application 212. Client application 212 is authenticated when the publisher identification that corresponds to the publisher name of client application 212 is found in the list of trusted client application publishers 216 by server services application 214. When client application 212 has been authenticated, server services application 214 may accept the connection of application services IPC channel 220 from client application 212 and may process application service request 234.

In some embodiments, the authentication of client application 212 may be further based on an application name of client application 212. Server services application 214 may search the list of trusted client application names 218 for the application name of client application 212. Client application 212 is authenticated when the publisher identification that corresponds to the publisher name of client application 212 is found in the list of trusted client application publishers 216 and the application name of client application 212 is found in the list of trusted client application names 218 by server services application 214. By including the application name of a client application in addition to the publisher name of the client application, server services application 214 may only allow certain client applications published by a specific publisher to be authenticated and run in application services system 202, rather than allowing all client applications published by the trusted publisher to be authenticated and run in application services system 202.

When the authentication of client application 212 fails, server services application 214 may deny application service request 234 from client application 212 and any other application service requests sent by client application 212 to maintain the security and integrity of application services system 202.

Figure 3:
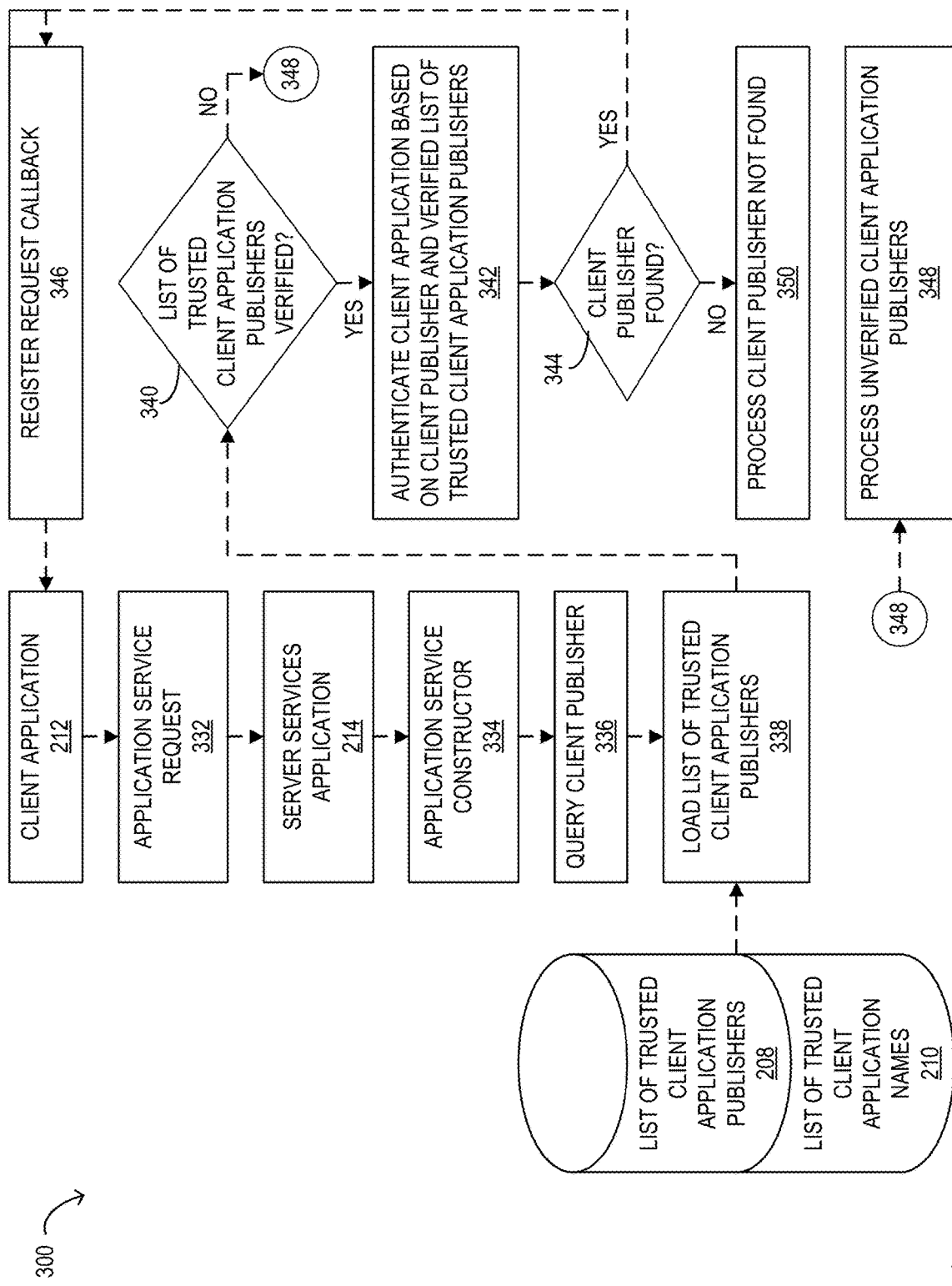
FIG. 3 is a flow diagram depicting selected elements of an embodiment of a method for securing application service providers from untrusted clients.

Turning now to FIG. 3, a flow diagram 300 depicting selected elements of an embodiment of a method for securing application service providers from untrusted clients. As shown in FIG. 3, client application 212 transmits an application service request 332 to server services application 214. Server services application 214 may receive application service request 332 and starts an application services constructor 334 for client application 212. At block 336, application services constructor 334 queries a publisher name of client application 212. At block 338, server services application 214 loads the list of trusted client application publishers 208 into server services application 214. At block 340, server services application 214 determines whether the list of trusted client application publishers 208 has been verified. When server services application 214 determines that the list of trusted client application publishers 208 has been verified, the flow diagram proceeds to block 342. Otherwise, the flow diagram proceeds to block 348. At block 342, server services application 214 authenticates client application 212 based on the publisher name of client application 212 and the list of trusted client application publishers 208 by searching the list of trusted client application publishers 208 for a publisher identification that corresponds to the publisher name of client application 212. Then, the flow diagram proceeds to block 344. At block 344, server services application 214 determines whether a publisher identification that corresponds to the publisher name of client application 212 has been found. When server services application 214 determines that a publisher identification that corresponds to the publisher name of client application 212 has been found, the flow diagram proceeds to block 346. Otherwise, the flow diagram proceeds to block 350. At block 346, server services application 214 registers a request callback for client application 212, accepts the connection of application services IPC channel 220 from client application 212, and processes application service request 332.

At block 348, server services application 214 processes the unverified list of trusted client application publishers 208. Server services application 214 may send a notification to an administrator of application services system 202 indicating that server services application 214 was unable to verify the integrity of the list of trusted client application publishers 208 so that corrective action may be taken. At block 350, server services application 214 processes the client publisher not found. When the authentication of client application 212 fails, server services application 214 denies application service request 332 from client application 212 and any other application service requests sent by client application 212 to maintain the security and integrity of application services system 202.

Figure 4:
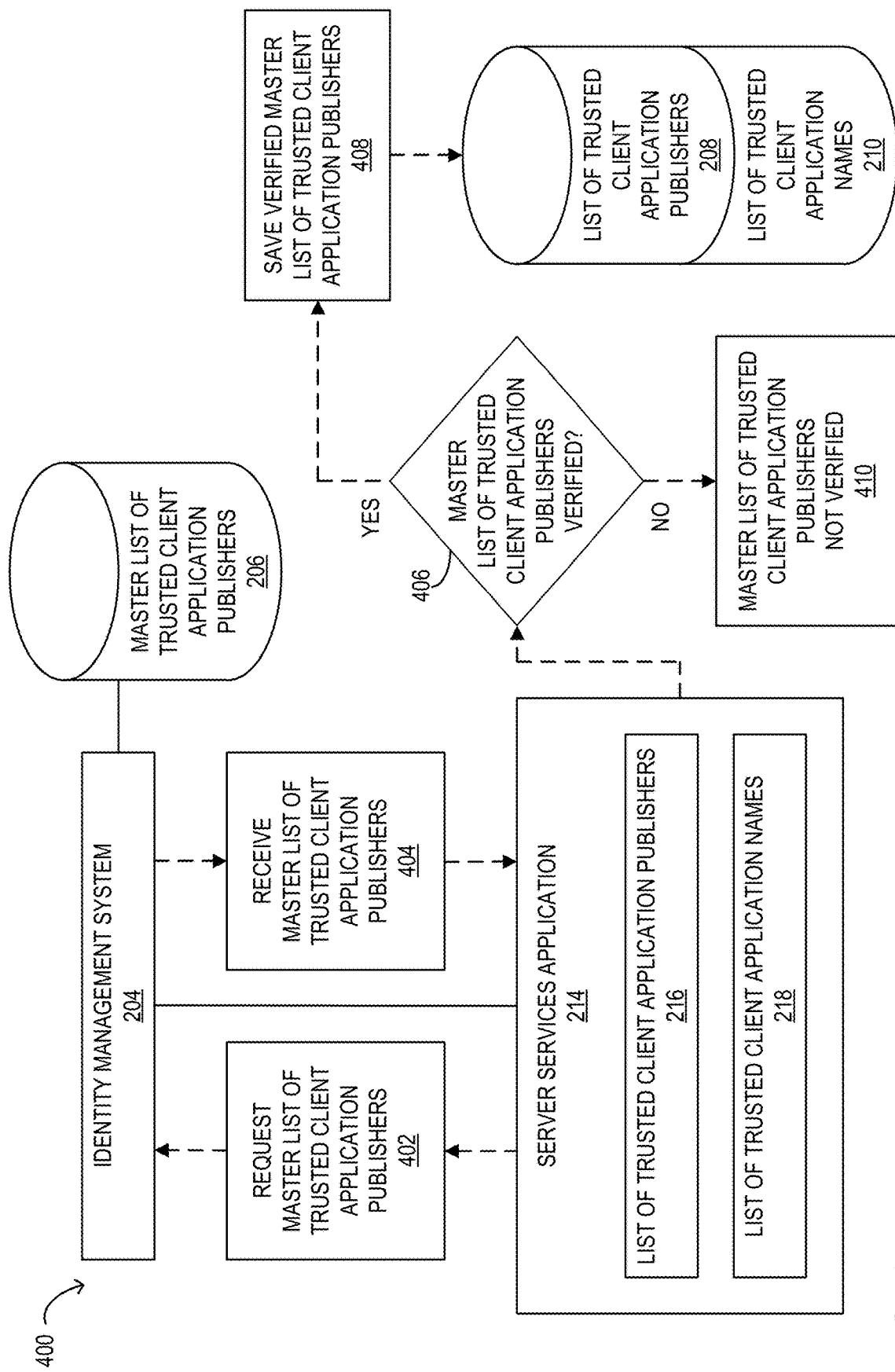
FIG. 4 is a flow diagram depicting selected elements of an embodiment of a method for updating a list of trusted client application publishers dynamically for securing application service providers from untrusted clients.

Turning now to FIG. 4, a flow diagram 400 depicting selected elements of an embodiment of a method for updating a list of trusted client application publishers dynamically for securing application service providers from untrusted clients. At block 402, server services application 214 transmits a request for a master list of trusted client application publishers 206 to identity management system 204. In response to the request, identity management system 204 transmits a master list of trusted client application publishers 206 to server services application 214. At block 404, server services application 214 receives the master list of trusted client application publishers 206 from identity management system 204. Server services application 214 verifies the integrity of the master list of trusted client application publishers 206 received from identity management system 204. The list of trusted client application publishers 206 may be asymmetrically signed and the integrity of the master list of trusted client application publishers 206 is verified using a public key within server services application 214. At block 406, server services application 214 determines whether the integrity of the master list of trusted client application publishers 232 has been verified. When server services application 214 determines that the integrity of the master list of trusted client application publishers 232 has been verified, the flow diagram proceeds to block 408. Otherwise, the flow diagram proceeds to block 410. At block 408, server services application 214 may save the master list of trusted client application publishers 206 to the list of trusted client application publishers 208 maintained by server services application 214. Server services application 214 may also load the list of trusted client application publishers 208 to a list of trusted client application publishers 216 for utilization by server services application 214. At block 410, the master list of trusted client application publishers 206 was not verified. Then, server services application 214 may send a notification to an administrator of application services system 202 indicating that server services application 214 was unable to verify the integrity of the master list of trusted client application publishers 206 received from identity management system 204 so that corrective action may be taken.

FIG. 5 is a flowchart depicting selected elements of an embodiment of a method for securing application service providers from untrusted clients. In method 500, the application service providers may be UWP application service providers and the untrusted clients may be UWP client applications. Method 500 may be performed by information handling system 100, secure application services system 200, previously described with reference to FIGS. 1 and 2, or another information handling system. It is noted that certain operations described in method 500 may be optional or may be rearranged in different embodiments.

Method 500 may begin at step 502, by transmitting, by a first client application of an information handling system, an first application service request over an application services inter-process communication (IPC) channel. At step 504, receiving, by a server services application of the information handling system, the first application service request from the first client application via the application services IPC channel. At step 506, querying, by the server services application, a publisher name of the first client application. At step 508, authenticating, by the server services application, the first client application that may be based on the publisher name of the first client application and a list of trusted client application publishers maintained by the server services application. At step 510, when the first client application is authenticated, processing, by the server services application, the first application service request.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
a non-transitory memory media storing instructions;
a processor in communication with the non-transitory memory media to execute the instructions to perform operations comprising:
transmit, by a first client application, a first application service request over an application services inter-process communication (IPC) channel;
receive, by a server services application, the first application service request from the first client application via the application services IPC channel;
query, by the server services application, a publisher name of the first client application;
authenticate, by the server services application, the first client application, including:
determining that both i) a publisher name of a publisher of the first client application corresponds to a publisher identification in a list of trusted client applications maintained by the server services application and ii) an application name of the first client application corresponds to a particular name in a list of trusted client application names maintained by the server services application, the list of trusted application names associated with the publisher name of the first client application; and
when the first client application is authenticated, process, by the server services application, the first application service request.

2. The information handling system of claim 1, the information handling system further comprising:
a network; and
an identity management system coupled to the network, wherein the server services application further configured to:
when the server services application starts:
request a master list of trusted client application publishers from the identity management system via the network;
receive the master list of trusted client application publishers from the identity management system;
verify integrity of the master list of trusted client application publishers; and
when the integrity of the master list of trusted client application publishers has been verified, save the master list of trusted client application publishers to the list of trusted client application publishers maintained by the server services application.

3. The information handling system of claim 2, wherein the server services application further configured to:
when the verification of the integrity of the master list of trusted client application publishers fails:
determine whether a previous verified list of trusted client application publishers maintained by the server services application is available; and
when the previous verified list of trusted client application publishers is available, save the previous verified list of trusted client application publishers to the list of trusted client application publishers maintained by the server services application.

4. The information handling system of claim 2, wherein the master list of trusted client application publishers is asymmetrically signed and the integrity of the master list of trusted client application publishers is verified using a public key within the server services application.

5. The information handling system of claim 1, the information handling system further comprising:
a network; and
an identity management system coupled to the network, wherein the server services application further configured to:
determine whether a master list of trusted client application publishers at the identity management system has been updated; and
when the master list of trusted client application publishers has been updated:
request the updated master list of trusted client application publishers from the identity management system via the network;
receive the updated master list of trusted client application publishers from the identity management system;
verify integrity of the updated master list of trusted client application publishers; and
when the integrity of the updated master list of trusted client application publishers has been verified, update the list of trusted client application publishers maintained by the server services application with the master list of trusted client application publishers.

6. The information handling system of claim 1, wherein the list of trusted client application publishers comprises at least one publisher identification.

7. The information handling system of claim 1, wherein the server services application further comprises an application services constructor, and wherein the application services constructor performs the query of the publisher name of the first client application.

8. The information handling system of claim 1, wherein the server services application comprises a universal windows platform (UWP) application, and wherein the first client application comprises a UWP application.

9. The information handling system of claim 1, wherein the first application service request comprises one of:
a request to utilize a device specific application programming interfaces (APIs) of a device of the information handling system;
a request to access device capabilities of a device of the information handling system; and
a request to communicate with a second client application of the information handling system.

10. The information handling system of claim 9, wherein the second client application is a 32-bit version of a windows (Win32) application.

11. The information handling system of claim 1, wherein the server services application further configured to:
when the authentication of the first client application fails, the first application service request is denied.

12. The information handling system of claim 1, the operations further comprising:
transmit, by a second client application, a second application service request over the IPC channel;
receive, by the server services application, the second application service request from the second client application via the application services IPC channel;
query, by the server services application, a publisher name of the second client application, wherein the publisher name of the first client application is the same as the publisher name of the second client application;
determine, by the server services application, that an application name of the second client application does not correspond to a specific name in the list of trusted client application names maintained by the server services application; and
in response to the determining that the application name of the second client application does not correspond to a specific name in the list of trusted client application names, denying, by the server services application, the second application service request.

13. A method, comprising:
transmitting, by a first client application of an information handling system, a first application service request over an application services inter-process communication (IPC) channel;
receiving, by a server services application of the information handling system, the first application service request from the first client application via the application services IPC channel;
querying, by the server services application, a publisher name of the first client application;
authenticating, by the server services application, the first client application including:
determining that both i) a publisher name of a publisher of the first client application corresponds to a publisher identification in a list of trusted client applications maintained by the server services application and ii) an application name of the first client application corresponds to a particular name in a list of trusted client application names maintained by the server services application, the list of trusted application names associated with the publisher name of the first client application; and
when the first client application is authenticated, processing, by the server services application, the first application service request.

14. The method of claim 13, the method further comprising:
when the server services application is starting:
requesting a master list of trusted client application publishers from an identity management system coupled to the information handling system by a network;
receiving the master list of trusted client application publishers from the identity management system;
verifying integrity of the master list of trusted client application publishers; and
when the integrity of the master list of trusted client application publishers has been verified, saving the master list of trusted client application publishers to the list of trusted client application publishers maintained by the server services application.

15. The method of claim 14, the method further comprising:
when the verification of the integrity of the master list of trusted client application publishers fails:
determining whether a previous verified list of trusted client application publishers maintained by the server services application is available; and
when the previous verified list of trusted client application publishers is available, saving the previous verified list of trusted client application publishers to the list of trusted client application publishers maintained by the server services application.

16. The method of claim 13, the method further comprising:
determining, by the server services application, whether a master list of trusted client application publishers at an identity management system has been updated, wherein the identity management system coupled to the information handling system by a network; and when the master list of trusted client application publishers has been updated:
- requesting the updated master list of trusted client application publishers from the identity management system via the network;
- receiving the updated master list of trusted client application publishers from the identity management system;
- verifying integrity of the updated master list of trusted client application publishers; and
- when the integrity of the updated master list of trusted client application publishers has been verified, updating the list of trusted client application publishers maintained by the server services application with the master list of trusted client application publishers, and wherein the master list of trusted client application publishers is asymmetrically signed and the integrity of the master list of trusted client application publishers is verified using a public key within the server services application.

17. The method of claim 13, wherein the server services application comprises a universal windows platform (UWP) application, and wherein the first client application comprises a UWP application.

18. The method of claim 13, wherein the first application service request comprises one of:
- a request to utilize a device specific application programming interfaces (APIs) of a device of the information handling system;
- a request to access device capabilities of a device of the information handling system; and
- a request to communicate with a second client application of the information handling system, and wherein the second client application is a 32-bit version of a windows (Win32) application.

* * * * *